Sept. 2, 1952        J. K. HALL        2,608,785
FISHHOOK RELEASER
Filed Feb. 12, 1948
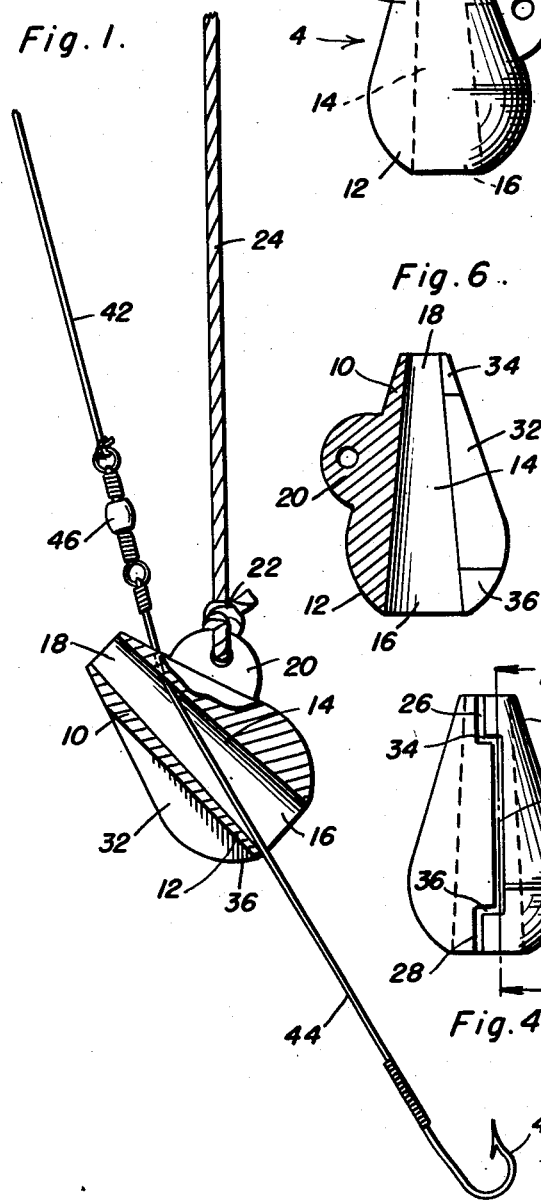
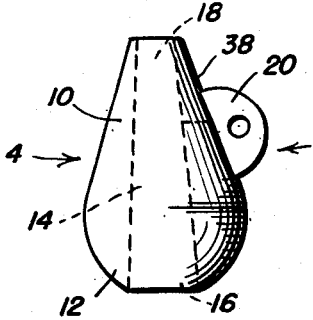
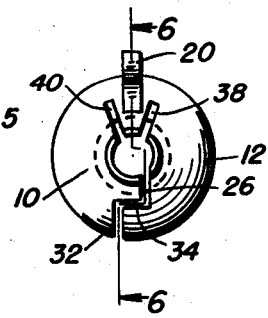
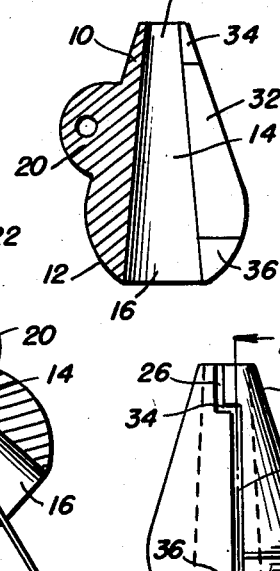
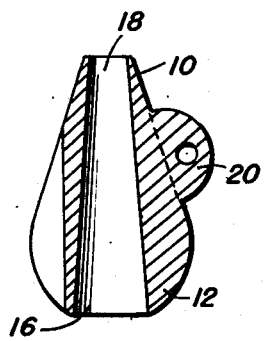
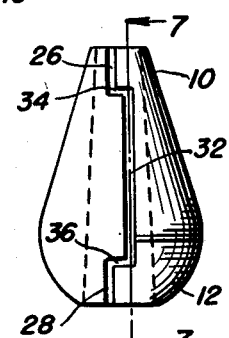
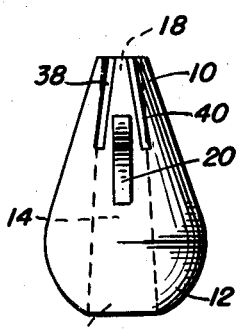
Inventor
John K. Hall
By *Clarence A. O'Brien and Harvey B. Jacobson*
Attorneys

UNITED STATES PATENT OFFICE 2,608,785

FISHHOOK RELEASER

John K. Hall, Miami, Fla.

Application February 12, 1948, Serial No. 7,796

1 Claim. (Cl. 43—17.2)

This invention relates to new and useful improvements in fishing devices and the primary object of the present invention is to provide a device applicable for fishing lines that will facilitate the convenient retrieval or lifting of heavy or large fish from the water's bottom or from the water, to bridges, docks or boats when the fisherman's line is too light or weak to carry the weight of the fish snagged thereon.

Another important object of the present invention is to provide a fishing device that is so designed as to permit the same to be effectively employed for releasing snagged hooks or plugs which have been accidentally caught on foreign objects beneath the surface of the water.

A further object of the present invention is to provide a fish hook releaser that is small and compact in structure and which embodies novel and improved means for locking the same at a selected point on a fishing line.

A still further aim of the present invention is to provide a fish and fish hook retriever that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a diagrammatic view showing the present invention in use, and with parts thereof broken away and shown in section;

Figure 2 is a front elevational view of the present fish hook releaser;

Figure 3 is a top plan view of the present fish hook releaser;

Figure 4 is a side elevational view taken substantially in the direction of arrow numbered 4 in Figure 2;

Figure 5 is a side elevational view taken substantially in the direction of arrow numbered 5 in Figure 2;

Figure 6 is a longitudinal vertical sectional view taken substantially on the plane of section line 6—6 of Figure 3; and, Figure 7 is a longitudinal vertical sectional view taken substantially on the plane of section line 7—7 of Figure 4.

Referring now to the drawings in detail, wherein for the purpose of illustration, there is disclosed a preferred embodiment of the present invention, the numeral 10 represents a substantially frusto-conical body element having an integral, rounded, annular reduced base portion 12. This body and base 10 and 12 are provided with a downwardly tapered, open ended, frusto-conical bore 14 having an enlarged lower end 16 and a reduced upper end 18.

Rigidly secured to or forming an integral part of the body 10, is an attaching ear 20 that engages one end 22 of a lifting cord or line 24. The lower end 16 and upper end 18 of the bore 14 communicate with longitudinal slots 26 and 28 provided in the upper end of the body 10 and the base 12, and these slots 26 and 28 are connected to a central longitudinal slot 32 provided in the body 10 by cross slots 34 and 36.

Provided in the opposite side of the body 10 at the upper end thereof, is a pair of spaced, downwardly extending locking slots 38 and 40 for a purpose which will later be more fully apparent.

In practical use of the present invention, a fishing line 42 is passed through the slots 26, 28, 32, 34 and 36 so that the same will be loosely positioned in the bore 14 which is so designed as to permit the body 10 to slide downwardly thereon to engage a leader 44 which is connected to the line 42 by a swivel 46. As an upward pull is exerted on the lifting cord 24, the body 10 will be tilted to raise the base portion 12, and the leader 44 will engage one of the diverging slots 38 and 40 adjacent the swivel 46 as shown best in Figure 1 of the drawings. The swivel will limit the upward sliding movement of the body 10 so that the cord 24 may be employed for disengaging the hook 48 carried by the leader from an article in which the same is snagged or for raising a fish carried by the line 42 without applying undue stress on the line 42.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

For use with a fishing line having an abutment thereon, a fish hook releaser comprising a body having a reduced upper end and a tapered bore therethrough, the reduced end of said tapered bore being disposed in the upper end of said body, an ear integrally formed with said body and disposed intermediate the ends of said body, a pulling member attached to said ear, said body having a plurality of circumferentially spaced diverging slots in its upper end for selectively receiving a line extending through the bore, and a pulling member attached to said ear for tilting the body to urge the line into one of said slots, said abutment being engaged by said body when the pulling member is raised.

JOHN K. HALL.

REFERENCES CITED

The following references are of record in the file of this patent:

UNITED STATES PATENTS

| Number | Name | Date |
| --- | --- | --- |
| D. 153,366 | Kocarek | Aug. 29, 1946 |
| 1,042,630 | Wetmore | Oct. 29, 1912 |
| 1,741,034 | Newton et al. | Dec. 24, 1929 |
| 2,097,536 | Shirk | Nov. 2, 1937 |
| 2,175,135 | Sorenson et al. | Oct. 3, 1939 |
| 2,385,415 | Jackson | Sept. 25, 1945 |
| 2,526,031 | Kocarek | Oct. 17, 1950 |